(12) United States Patent
Chang et al.

(10) Patent No.: US 10,095,617 B2
(45) Date of Patent: Oct. 9, 2018

(54) MEMORY DEVICE WITH FLEXIBLE DATA TRANSFER RATE INTERFACE AND METHOD THEREOF

(71) Applicant: Macronix International Co., Ltd., Hsinchu (TW)

(72) Inventors: Kuen-Long Chang, Taipei (TW); Su-Chuch Lo, Hsinchu (TW); Chao Hsin Lin, Taichung (TW); Ken-Hui Chen, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 372 days.

(21) Appl. No.: 14/860,744

(22) Filed: Sep. 22, 2015

(65) Prior Publication Data
US 2017/0083439 A1    Mar. 23, 2017

(51) Int. Cl.
*G06F 12/06*    (2006.01)
(52) U.S. Cl.
CPC .. *G06F 12/0646* (2013.01); *G06F 2212/1016* (2013.01)

(58) Field of Classification Search
CPC ................... G06F 12/0646; G06F 2212/1016
See application file for complete search history.

(56) References Cited

U.S. PATENT DOCUMENTS 5,497,354 A * 3/1996 Sweha ............... G11C 11/5621
                                                        365/207
5,692,138 A * 11/1997 Fandrich ............ G06F 13/1642
                                                        365/189.05

FOREIGN PATENT DOCUMENTS

TW   200823920    6/2008
TW   201437814    10/2014

* cited by examiner

*Primary Examiner* — Aracelis Ruiz
(74) *Attorney, Agent, or Firm* — Finnegan, Henderson, Farabow, Garrett & Dunner LLP

(57) ABSTRACT

A memory device includes an input/output interface configured to receive and output signals. The input/output interface is configured to receive a memory address to be accessed and data sequence information within a clock cycle or at a rising or falling edge of a clock cycle. The data sequence information specifies an input or output data sequence.

20 Claims, 7 Drawing Sheets

MEMORY DEVICE WITH FLEXIBLE DATA TRANSFER RATE INTERFACE AND METHOD THEREOF

TECHNICAL FIELD

Exemplary embodiments relate to an electronic device and, more particularly, to an electronic device having a memory device with a flexible data transfer rate interface and a method thereof.

BACKGROUND

Today many electronic devices include a memory device to store data. Generally, in conventional memory devices with a serial protocol interface (SPI), a memory byte address to be accessed is specified by one or more commands. When the bus width is 8 input/output (I/O) bits or more, with a double transfer rate (DTR) or double data rate (DDR) interface, the least significant bit (LSB) A0 of byte address may be unused because the output would be 2 bytes (or 1 word) per clock cycle, i.e., a first byte on a clock rising edge and second byte on a clock falling edge.

Figure 1A:
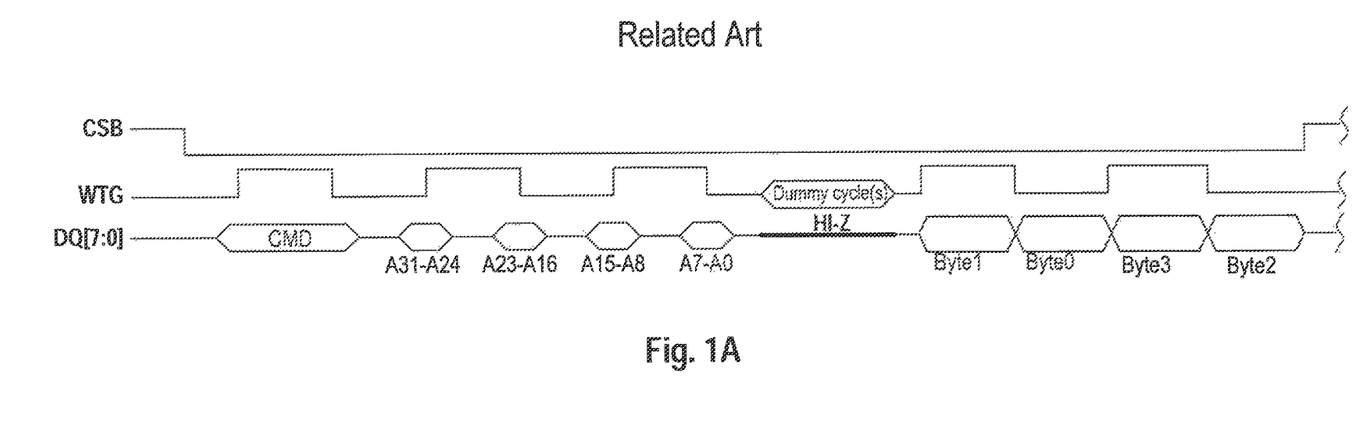
FIGS. 1A and 1B shows waveform diagrams of related art.
Figure 1B:
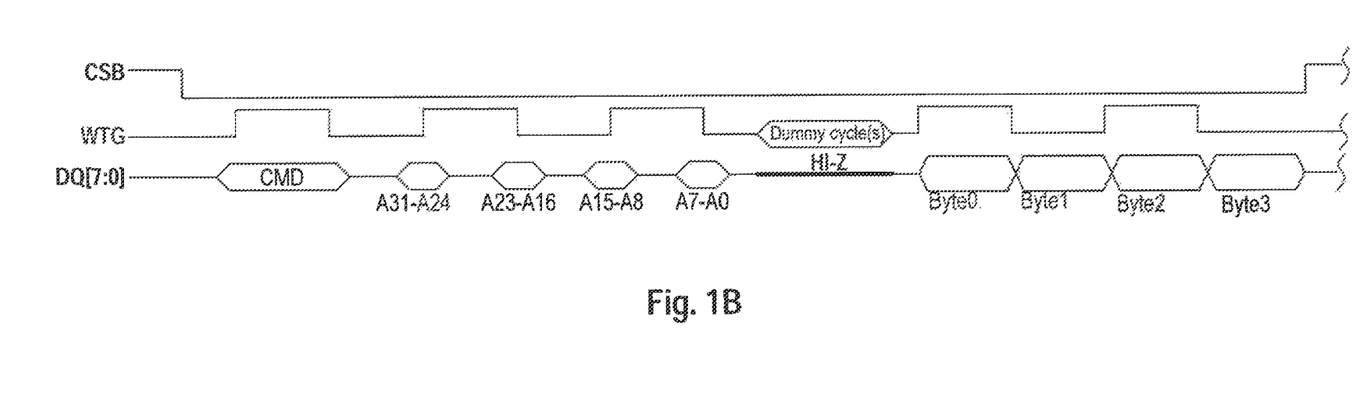

FIGS. 1A and 1B are timing diagrams showing waveforms of data output segments of a memory read operation. In FIGS. 1A and 1B, the waveforms include an 8-bit memory address followed by data output DQ[7:0], a clock signal WTG, and a chip select signal CSB. The read operation illustrates a DTR 8 I/O interface, in which one word (or 2 bytes) in each clock cycle is output in two different sequences. First, referring to FIG. 1A, a high byte (or odd byte) is output before a low byte (or even byte). This sequence is called "high-byte-first," in which odd bytes are output before even bytes. Second, referring to FIG. 1B, a low byte (or even byte) is output before a high byte (or odd byte). This sequence is called "low-byte-first," in which even bytes are output before odd bytes.

Generally, a memory device utilizes only one of the "high-byte-first" or "low-byte-first" sequences. Memory device vendors therefore need to provide different devices to fulfill the demand for different data input or output sequences.

SUMMARY OF EMBODIMENTS

According to a first aspect of the present disclosure, there is provided a memory device including an input/output interface configured to receive and output signals. The input/output interface is configured to receive a memory address to be accessed and data sequence information within a clock cycle or at a rising or falling edge of a clock cycle. The data sequence information specifies an input or output data sequence.

According to a second aspect of the present disclosure, there is provided a method of transferring data. The method includes forwarding to a memory device a memory address to be accessed and data sequence information within a clock cycle or at a rising or falling edge of a clock cycle. The data sequence information specifies an input or output data sequence.

According to a third aspect of the present disclosure, there is provided a non-transitory computer-readable storage medium storing instructions which, when executed by one or more processors, cause the one or more processors to forward to a memory device a memory address to be accessed and data sequence information within a clock cycle or at a rising or falling edge of a clock cycle, the data sequence information specifying an input or output data sequence.

BRIEF DESCRIPTION OF THE DRAWINGS

Reference will now be made, by way of example, to the accompanying drawings which show exemplary embodiments of the present application, and in which.

DESCRIPTION OF EXAMPLE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 2:
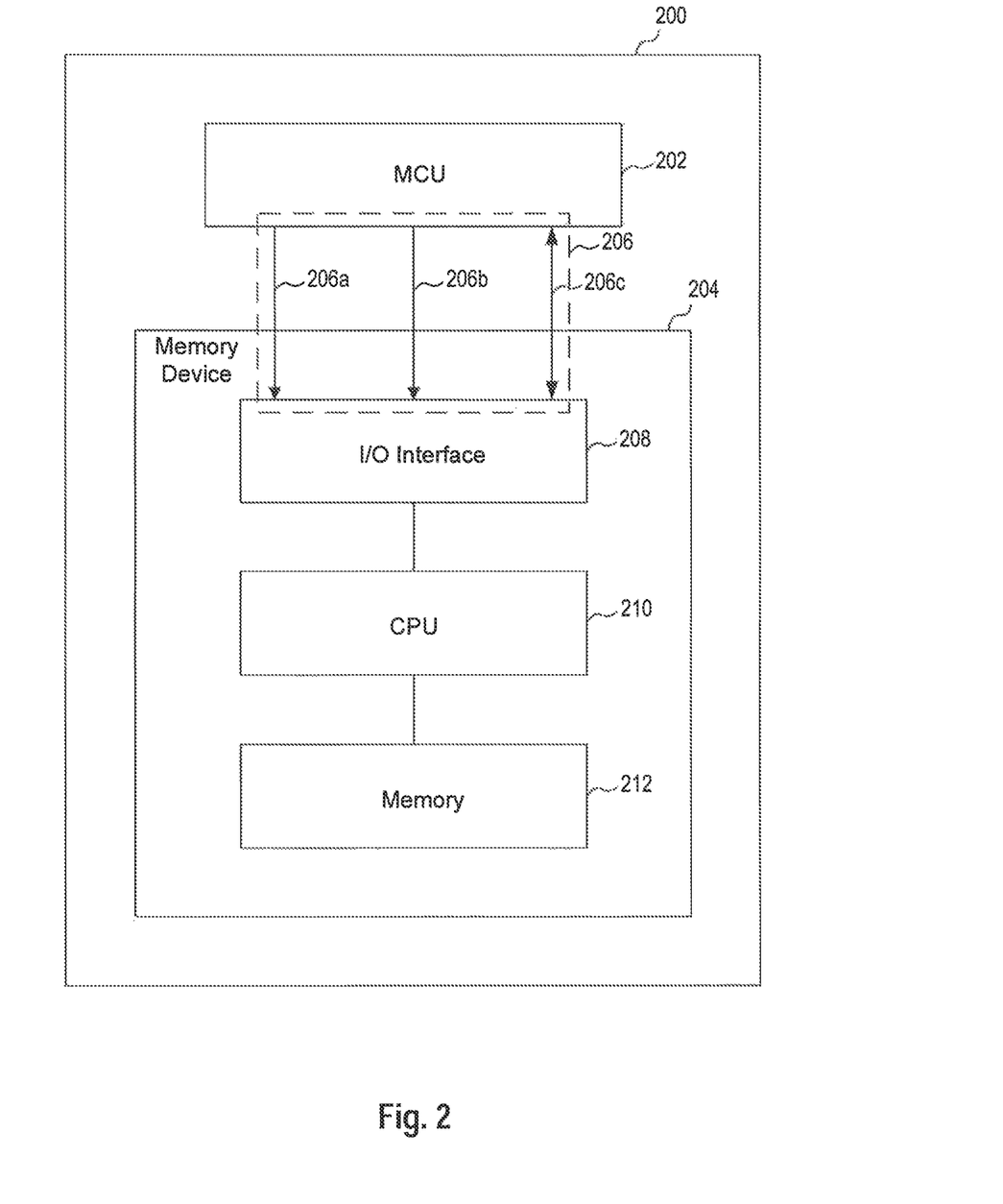
FIG. 2 shows a schematic diagram of an electronic device.

FIG. 2 depicts an exemplary electronic device 200. Electronic device 200 includes a microcontroller unit (MCU) 202, a memory device 204, and one or more data buses 206. In one embodiment, as illustrated in FIG. 2, buses 206 include three buses 206a, 206b, and 206c. MCU 202 is configured to send control signals and data to, and receive data from, memory device 204. Memory device 204 may be embedded in or detachably coupled to electronic device 200. For example, memory device 204 may be a memory card that can be inserted into or detached from a socket of electronic device 200. Electronic device 200 may be, for example, a cell phone, a game station, a tablet, a TV, or any other similar kind of device.

Memory device 204 includes an I/O interface 208, a central processing unit (CPU) 210, and memory unit 212. CPU 210 is configured to execute instructions stored in memory unit 212 to control memory device 204. Data buses 206 are coupled between MCU 202 and I/O interface 208. In some embodiments, bus 206a is configured to transmit chip select signals CSB, bus 206b is configured to transmit clock signals WTG, and bus 206c is configured to transmit data signals. Memory unit 212 is configured to store data accessible by MCU 202 by a read or write operation. In exemplary embodiments, memory unit 212 may be a nonvolatile or volatile memory.

The present embodiments provide an electronic device having an I/O interface that can simultaneously, i.e., within the same clock cycle or within the same clock edge, receive a portion of a memory access address and data sequence information, as described more fully below. The data sequence information specifies the sequence of data output from or input to a memory device. The electronic device uses one bit to represent an output or input sequence and other bits to represent at least one accessed address of the memory. In some embodiments, the bit specifying the output sequence is the LSB.

Figure 3A:
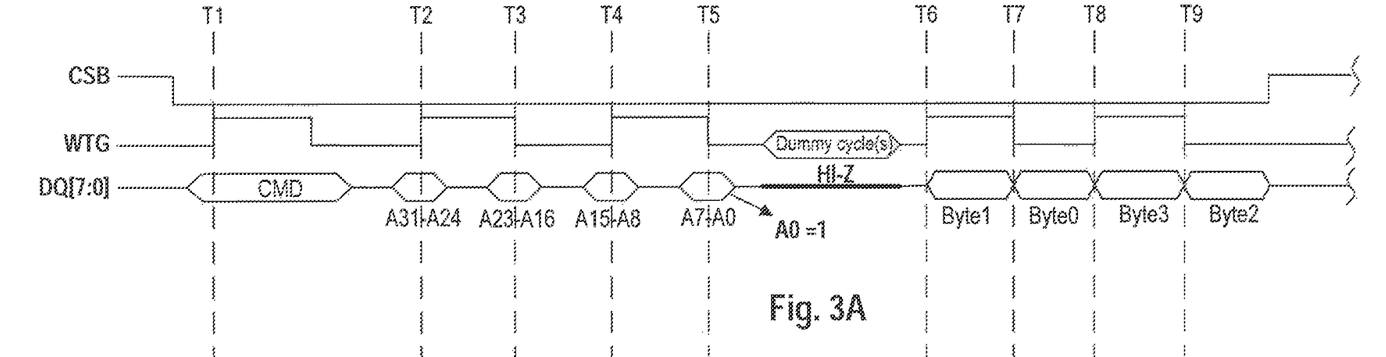
FIG. 3A is an exemplary timing diagram showing waveforms of a read operation on a memory device.
Figure 3B:
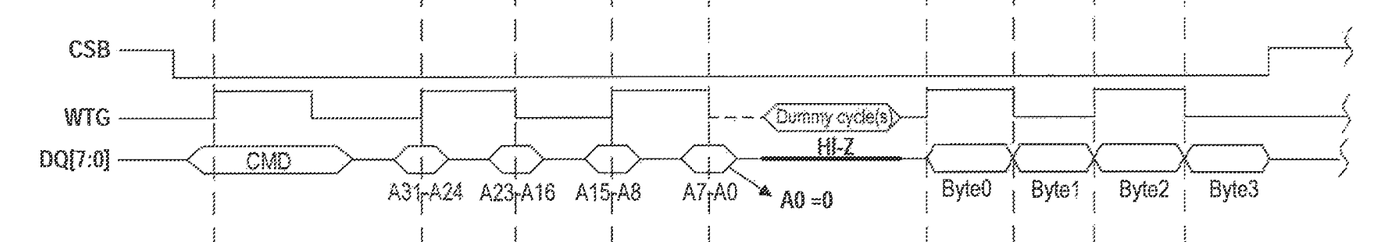
FIG. 3B is an exemplary timing diagram showing waveforms of a read operation on a memory device.

FIGS. 3A and 3B are timing diagrams showing exemplary waveforms of a read operation on a memory device, such as memory device 204 in FIG. 2, having a DTR 8 I/O interface. For example, the waveforms in the diagrams may be transmitted between memory device 204 and MCU 202 via buses 206 coupled to memory device 204. In FIGS. 3A and 3B, the waveforms include a memory address and data output DQ[7:0] transmitted in a unit of 8 bits, a clock signal WTG, and a chip select signal CSB. The portion of the timing diagram commencing at time T1 and extending through time T5 of the clock signal WTG is referred to herein as a command section and the portion commencing at time T6 is referred to herein as an output section.

Referring to FIG. 3A, a system command signal CMD is received by I/O interface 208 at time T1 on a rising edge of clock signal WTG. Subsequently, at time T2 when clock signal WTG is again at a rising edge, a first portion of memory address data (A31-A24) is received by I/O interface 208. At time T3, in the same clock cycle as T2, when clock signal WTG is at a falling edge, a second portion of the memory address data (A23-A16) is received. At time T4, on a rising edge of the next clock cycle, a third portion of the memory address data (A15-A8) is received. At time T5, in the same clock cycle as T4 on a falling edge of clock signal WTG, a fourth portion of the memory address data (A7-A0) is received, in which one or more bits of A7-A0 are not part of the memory address to be accessed. In one embodiment, the fourth portion of the memory address data (A7-A0) includes memory address bits and one bit indicating the data output sequence.

To provide a flexible and selectable output sequence, A0 or another bit among the less significant bits can be used to select the output data sequence. The less significant bit may be a bit subsequent to the bits representing the memory address to be accessed. For example, a less significant bit may be A1 or A2, or another bit not part of the memory address to be accessed. In the illustrated embodiment, CPU 210 of memory device 204 is configured to read A0 and A0 is not part of the memory address to be accessed. For example, in one embodiment, when A0=1, the high-byte-first sequence is selected. According to the high-byte-first sequence applied in the DTR 8 I/O interface, a high byte (or odd byte) is output at a rising edge of a clock cycle before a low byte (or even byte) is output at a falling edge of the clock cycle. Referring again to FIG. 3A, in the output section of the timing diagram commencing at time T6, memory device 204 outputs data beginning from the data stored at the memory address specified by the memory address data (A31-A1). For example, in some embodiments, memory address data A31-A1 specify the addresses of Byte 0 and Byte 1, and A0 specifies which of Byte 0 and Byte 1 will be output first. After A0=1 is received, CPU 210 of memory device 204 outputs Byte 1 (a high byte) at time T6 on the rising edge of a clock cycle, and outputs Byte 0 (a low byte) at time T7 on the falling edge of the clock cycle. In the next clock cycle, CPU 210 of memory device 204 outputs Byte 3 (a high byte) at time T8 on the rising edge of the clock cycle, and outputs Byte 2 (a low byte) at time T9 on the falling edge of the clock cycle. In the present example, each of Byte 0-Byte 3 is 8 bits and Byte 0 and Byte 1 together constitute a first 16-bit word specified by memory address data A31-A1. Byte 2 and Byte 3 together constitute a second word that is sequentially output after the first word.

Although four bytes (Byte 0-Byte 3), i.e., two words, are illustrated to be output in FIG. 3A, the quantity of the output data is not so limited. Data that is more or less than four bytes can be output consistent with the embodiment. For example, MCU 202 can control chip select signal CSB and clock signal WTG to control memory device 204 as to the number of words output after the first word. Thus, while address A31-A1 represents the starting address of Byte 0 and Byte 1, memory device 204 can subsequently output an arbitrary number of words thereafter, e.g., until MCU 202 asserts a high level of chip select signal CSB. For example and without limitation, memory device 204 can output data in a sequence of Byte 0, Byte 1, Byte 2, Byte 3, Byte 4, Byte 5, Byte, 6, Byte 7, Byte 8, Byte 9, Byte 10, Byte 11, . . . if A0=0; or in a sequence of Byte 1, Byte 0, Byte 3, Byte 2, Byte 5, Byte 4, Byte, 7, Byte 6, Byte 9, Byte 8, Byte 11, Byte 10, . . . if A0=1, where Bytes 4 and 5 are of the same word, Bytes 6 and 7 are of the same word, . . . etc.

Similarly, in some embodiments, the low-byte-first sequence may instead be selected by means of a different value of A0. For example, when A0=0, the low-byte-first sequence is selected. According to the low-byte-first sequence applied in the DTR 8 I/O interface, a low byte (or even byte) is output at a rising edge of a clock cycle before a high byte (or odd byte) is output at a falling edge of the same clock cycle. FIG. 3B shows exemplary waveforms of a read operation on memory device 204. The detailed description of the waveforms in FIG. 3B from T1 through T5 is similar to that of FIG. 3A and is not repeated, except that the value of LSB A0 is set to zero (A0=0). Referring to FIG. 3B, in the output section of the timing diagram commencing at time T6, memory device 204 outputs data beginning from the data stored at the memory address specified by the memory address data (A31-A1). Accordingly, after A0=0 is received, CPU 210 of memory device 204 outputs Byte 0 (a low byte) at time T6 on the rising edge of a clock cycle, and outputs Byte 1 (a high byte) at time T7 on the falling edge of the clock cycle. As in the example shown in FIG. 3A, Byte 0 and Byte 1 in FIG. 3B together constitute the first word specified by memory address data A31-A1. In the next clock cycle, CPU 210 of memory device 204 outputs Byte 2 (a low byte) at time T8 on the rising edge of the clock cycle, and outputs Byte 3 (a high byte) at time T9 on the falling edge of the clock cycle. As in the example shown in FIG. 3A, Byte 2 and Byte 3 in FIG. 3B together constitute a second word sequentially output after the first word. Although four bytes (Byte 0-Byte 3) are illustrated to be output in FIG. 3B, the quantity of the output data is not so limited. Data of more or less than four bytes can be output consistent with the embodiment, as described above.

Accordingly, the embodiments of this disclosure provide an electronic device having an I/O interface that can simultaneously receive a portion of a memory access address and information indicating data output sequence. Here, "simultaneously" means within the same clock cycle, e.g., T4 and T5 in FIGS. 3A and 3B, in which A15-A1 contains portions of memory address data indicating the memory address to be accessed and A0 indicates the data input sequence, or at the same clock edge, e.g., T5 in FIGS. 3A and 3B, in which A7-A1 contains a portion of memory address data indicating the memory address to be accessed and A0 indicates the data input sequence. The electronic device reads one bit to determine the output sequence and other bits to determine the accessed address of the memory. In some embodiments, the bit specifying the output sequence is the LSB. In the embodiments above, although A0=1 selects the high-byte-first sequence and A0=0 selects the low-byte-first sequence, the disclosure is not limited to these settings. For example, A0=1 may be used to select the low-byte-first sequence and A0=0 may be used to select the high-byte-first sequence.

In some embodiments, as shown in FIGS. 3A and 3B, one or more dummy cycles are disposed between the command section (T1-T5) and the output section (T6-T9). During the dummy cycles, memory device 204 receives a high impedance signal (HI-Z) from MCU 202.

Figure 4A:
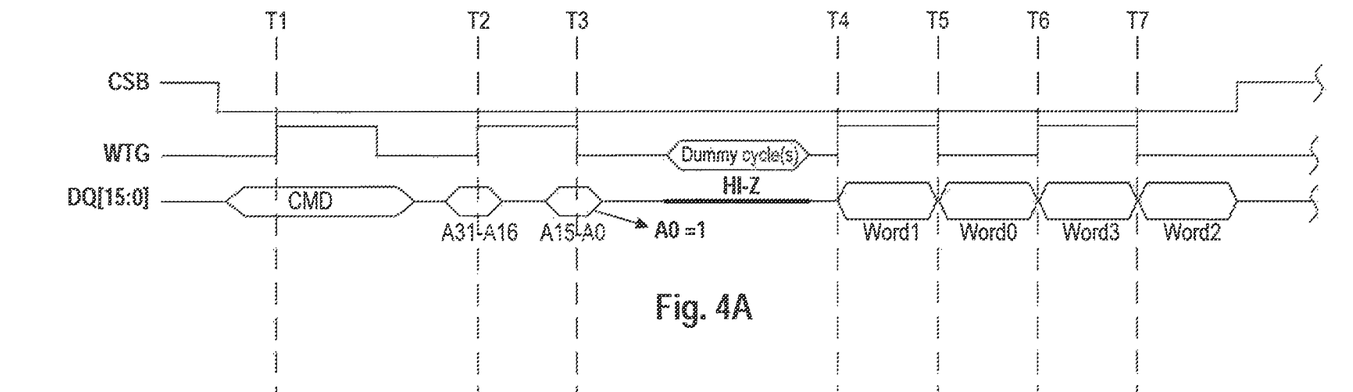
FIG. 4A is an exemplary timing diagram showing waveforms of a read operation on a memory device.
Figure 4B:
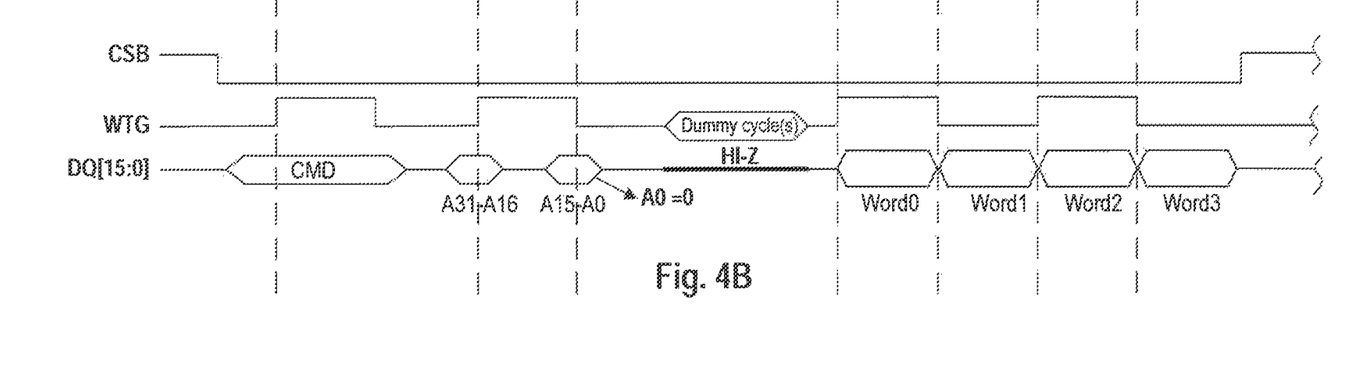
FIG. 4B is an exemplary timing diagram showing waveforms of a read operation on a memory device.

In other embodiments, flexible selection of data sequences may be applied to other interfaces, such as a DTR 16 I/O or a single data rate (SDR) 16 I/O interface. FIGS. 4A and 4B are timing diagrams showing exemplary waveforms of a read operation on a memory device, such as memory device 204 in FIG. 2, having a DTR 16 I/O interface. For example, the signals in the diagrams may be transmitted between MCU 202 and memory device 204 via buses 206 (FIG. 2). In FIGS. 4A and 4B, the waveforms include a memory address and data output DQ[15:0] transmitted in a unit of 16 bits, a clock signal WTG, and a chip select signal CSB. The portion of the timing diagram commencing at time T1 and extending through time T3 of the clock signal WTG is referred to herein as a command section and the portion commencing at time T4 is referred to herein as an output section.

Referring to FIG. 4A, a system command signal CMD is received at time T1 on a rising edge of clock signal WTG. Subsequently, at time T2 on the next rising edge of clock signal WTG, a first portion of memory address data (A31-A16) is received. At time T3, in the same clock cycle as containing T2, on a falling edge of clock signal WTG, a second portion of the memory address data (A15-A0) is received, in which one or more bits of A15-A0 are not part of the memory address to be accessed. In the illustrated embodiment, the second portion of the memory address data (A15-A0) includes memory address bits and one bit indicating the data output sequence.

To provide a flexible and selectable output sequence, A0 or another bit among the less significant bits can be used to select the output data sequence. For example, in the illustrated embodiment, when A0=1, a high-word-first sequence is selected. According to the high-word-first sequence applied in DTR 16 I/O interface, a high word (or odd word) is output on a rising edge of a clock cycle before a low word (or even byte) is output on a falling edge of the clock cycle. Referring again to FIG. 4A, in the output section of the timing diagram commencing at time T4, memory device 204 outputs data beginning from the data stored at the memory address specified by the memory address data (A31-A1). Accordingly, after A0=1 is received, CPU 210 of memory device 204 outputs Word 1 (a high word) at time T4 on the rising edge of a clock cycle, and outputs Word 0 (a low word) at time T5 on the falling edge of the clock cycle. In the next clock cycle, CPU 210 of memory device 204 outputs Word 3 (a high word) at time T6 on the rising edge of the clock cycle, and outputs Word 2 (a low byte) at time T7 on the falling edge of the clock cycle. Although four words (Word 0-Word 3) are illustrated to be output in FIG. 4A, the quantity of the output data is not so limited. Data of more or less than four words can be output consistent with the embodiment, under control of MCU 202, as similarly described with reference to FIGS. 3A and 3B.

Similarly, in some embodiments, the low-word-first sequence may instead be selected using a different value of A0. For example, when A0=0, a low-word-first sequence is selected. According to the low-word-first sequence applied in DTR 16 I/O interface, a low word (or even word) is output at a rising edge of a clock cycle before a high word (or odd word) is output at a falling edge of the same clock cycle. FIG. 4B shows waveforms of a read operation on memory device 204 outputting data in the low-word-first sequence. The detailed description of the waveforms in FIG. 4B from T1 through T3 is similar to that of FIG. 4A and is not repeated, except that the value of LSB A0 is set to zero (A0=0). Referring to FIG. 4B, in the output section of the timing diagram commencing at time T4, memory device 204 outputs data beginning from the data stored at the memory address specified by the memory address data (A31-A1). Accordingly, after A0=0 is received, CPU 210 of memory device 204 outputs Word 0 (a low word) at time T4 on the rising edge of a clock cycle, and outputs Word 1 (a high word) at time T5 on the falling edge of the clock cycle. In the next clock cycle, CPU 210 of memory device 204 outputs Word 2 (a low word) at time T6 on the rising edge of the clock cycle, and outputs Word 3 (a high word) at time T7 on the falling edge of the clock cycle. Although four words (Word 0-Word 3) are illustrated to be output in FIG. 4B, the quantity of the output data is not so limited. Data of more or less than four words can be output consistent with the embodiment, under control of MCU 202, as similarly described with respect to FIGS. 3A and 3B.

Figure 5A:
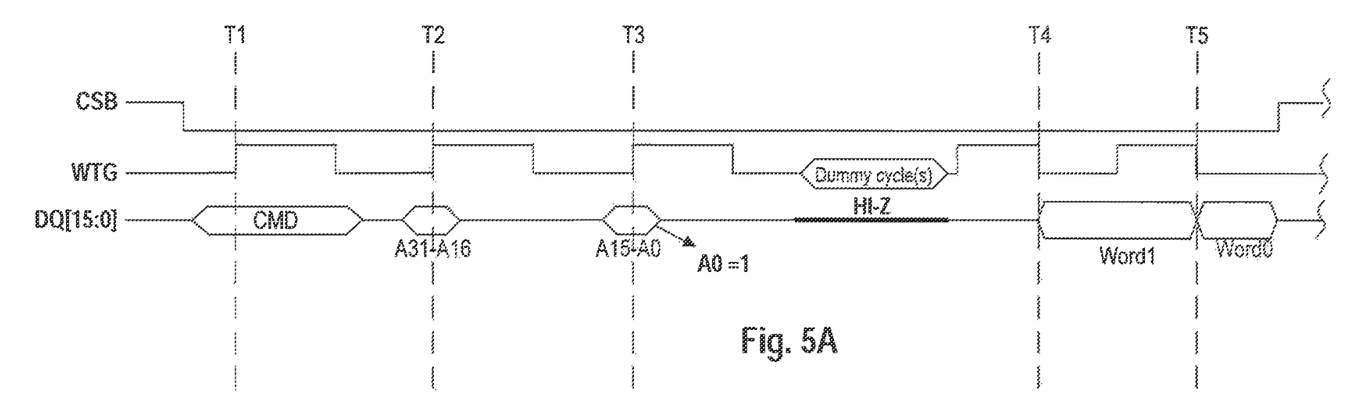
FIG. 5A is an exemplary timing diagram showing waveforms of a read operation on a memory device.
Figure 5B:
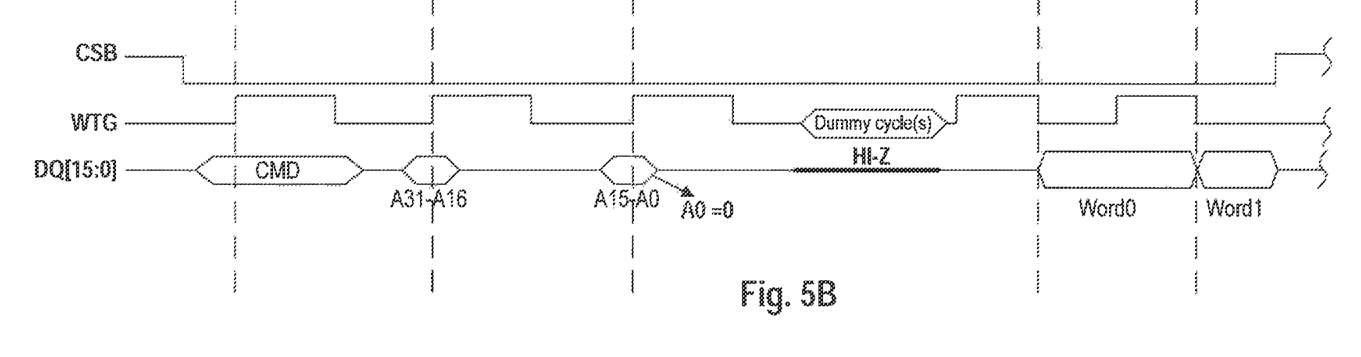
FIG. 5B is an exemplary timing diagram showing waveforms of a read operation on a memory device.

FIGS. 5A and 5B are exemplary timing diagrams showing waveforms of a read operation on a memory device, such as memory device 204 in FIG. 2, having an SDR 16 I/O interface. For example, the signals in the diagram may be transmitted between MCU 202 and memory device 204 via buses 206 (FIG. 2). In FIGS. 5A and 5B, the waveforms include a memory address and data output DQ[15:0] transmitted in a unit of 16 bits, a clock signal WTG, and a chip select signal CSB. The portion of the timing diagram commencing at time T1 and extending through time T3 of the clock signal WTG is referred to herein as a command section and the portion commencing at time T4 is referred to herein as an output section.

Referring to FIG. 5A, a system command signal CMD is received at time T1 on a rising edge of clock signal WTG. Subsequently, at time T2 on the next rising edge of clock signal WTG, a first portion of memory address data (A31-A16) is received. At time T3 on the next rising edge of clock signal WTG, a second portion of the memory address data (A15-A0) is received, in which one or more bits of A15-A0 are not part of the memory address to be accessed. In the illustrated embodiment, the second portion of the memory address data (A15-A0) includes memory address bits and one bit indicating the data output sequence.

To provide a flexible and selectable output sequence, A0 or another bit among the less significant bits can be used to select the output data sequence. For example, in the illustrated embodiment, CPU 210 of memory device 204 is configured to read A0 and A0 is not part of the memory address to be accessed. When A0=1, the high-word-first sequence is selected. According to the high-word-first sequence applied in the SDR 16 I/O interface, a high word (or odd word) is output on a falling edge of a clock cycle before a low word (or even byte) is output on another falling edge of a subsequent clock cycle in a SDR interface. Referring again to FIG. 5A, in the output section of the timing diagram commencing at time T4, memory device 204 outputs data beginning from the data stored at the memory address specified by the memory address data (A31-A1). Accordingly, after A0=1 is received, CPU 210 of memory device 204 outputs Word 1 (a high word) at time T4 on the falling edge of a clock cycle, and outputs Word 0 (a low word) at time T5 on the falling edge of the next clock cycle. Although two words (Word 0-Word 1) are illustrated to be output in FIG. 5A, the quantity of the output data is not so limited. Data of more or less than two words can be output consistent with the embodiment, under control of MCU 202, as similarly described with respect to FIGS. 3A and 3B.

Similarly, in some embodiments, the low-word-first sequence may instead be selected using a different value of A0. For example, when A0=0, the low-word-first sequence is selected. According to the low-word-first sequence applied in the SDR 16 I/O interface, a low word (or even word) is output on a falling edge of a clock cycle before a high word (or odd word) is output on a falling edge of the subsequent clock cycle. FIG. 5B shows waveforms of a read operation on memory device 204 outputting data in the low-word-first sequence in a SDR 16 I/O interface. The detailed description of the waveforms in FIG. 5B from T1 through T3 is similar to that of FIG. 5A and is not repeated, except that the value of LSB A0 is set to zero (A0=0). Referring to FIG. 5B, in the output section of the timing diagram commencing at time T4, memory device 204 outputs data beginning from the data stored at the memory address specified by the memory address data (A31-A1). Accordingly, after A0=0 is received, memory device 204 outputs Word 0 (a low word) at time T4 on the falling edge of a clock cycle, and outputs Word 1 (a high word) at time T5 on the falling edge of the next clock cycle. Although two words (Word 0-Word 1) are illustrated to be output in FIG. 5B, the quantity of the output data is not so limited. Data of more or less than two words can be output consistent with the embodiment, under control of MCU 202, as similarly described with respect to FIGS. 3A and 3B.

Figure 6A:
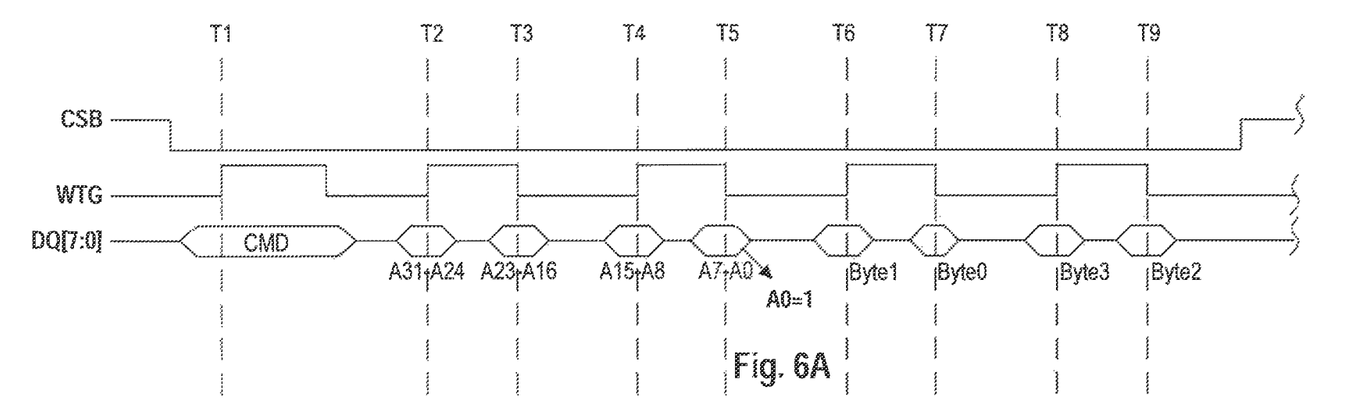
FIG. 6A is an exemplary timing diagram showing waveforms of a write operation on a memory device.
Figure 6B:
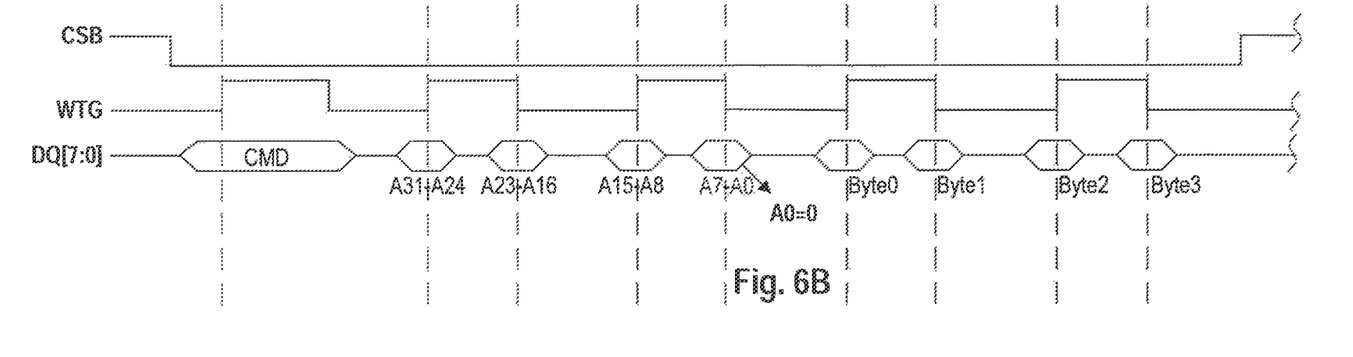
FIG. 6B is an exemplary timing diagram showing waveforms of a write operation on a memory device.

FIGS. 6A and 6B are timing diagrams showing exemplary waveforms of a write operation on a memory device, such as memory device 204 in FIG. 2, having a DTR 8 I/O interface, consistent with embodiments of the present disclosure. For example, the waveforms in the diagrams may be transmitted between MCU 202 and memory device 204 via one or more buses 206 coupled to memory device 204. In FIGS. 6A and 6B, the waveforms include a memory address and data input DQ[7:0] transmitted in a unit of 8 bits, a clock signal WTG, and a chip select signal CSB. The portion of the timing diagram commencing at time T1 and extending through time T5 of the clock signal WTG is referred to herein as a command section and the portion commencing at time T6 is referred to herein as a data input section.

Referring to FIG. 6A, a system command signal CMD is received at time T1 on a rising edge of clock signal WTG. Subsequently, at time T2 on the next rising edge of clock signal WTG, a first portion of memory address data (A31-A24) is received. At time T3, in the same clock cycle as T2, on a falling edge of the same clock cycle of clock signal WTG, a second portion of the memory address data (A23-A16) is received. At time T4, in the next clock cycle, on a rising edge of clock signal WTG, a third portion of the memory address data (A15-A8) is received. At time T5, in the same clock cycle as T4, on a falling edge of clock signal WTG, a fourth portion of the memory address data (A7-A0) is received, in which one or more bits of A7-A0 are not part of the memory address to be accessed. In the illustrated embodiment, the fourth portion of the memory address data (A7-A0) includes memory address bits and one bit indicating the data output sequence.

To provide a flexible and selectable input sequence, A0 or another bit among the less significant bits can be used to select the input data sequence. CPU 210 of memory device 204 can be configured to read A0. For example, in the illustrated embodiment, when A0=1, the high-byte-first sequence is selected. According to the high-byte-first input sequence applied in the DTR 8 I/O interface, a high byte (or odd byte) is input on a rising edge of a clock cycle before a low byte (or even byte) is input on a falling edge of the clock cycle. Referring again to FIG. 6A, in the data input section of the timing diagram commencing at time T6, memory device 204 inputs data beginning from the data to be stored at the memory address specified by the memory address data (A31-A1). For example, in some embodiments, memory address data A31-A1 specify the addresses of Byte 0 and Byte 1, and A0 specifies which of Byte 0 and Byte 1 will be input first. Accordingly, after A0=1 is received, CPU 210 of memory device 204 inputs Byte 1 (a high byte) at time T6 on the rising edge of a clock cycle, and inputs Byte 0 (a low byte) at time T7 on the falling edge of the clock cycle. In the next clock cycle, memory device 204 inputs Byte 3 (a high byte) at time T8 on the rising edge of the clock cycle, and inputs Byte 2 (a low byte) at time T9 on the falling edge of the clock cycle. Although four bytes (Byte 0-Byte 3) are illustrated to be input in FIG. 6A, the quantity of the output data is not so limited. Data of more or less than four bytes can be input consistent with the embodiment, under control of MCU 202, as similarly described with respect to FIGS. 3A and 3B.

Similarly, in some embodiments, the low-byte-first input sequence may be selected using a different value of A0. For example, when A0=0, the low-byte-first input sequence is selected. According to the low-byte-first input sequence applied in the DTR 8 I/O interface, a low byte (or even byte) is input on a rising edge of a clock cycle before a high byte (or odd byte) is input on a falling edge of the same clock cycle. FIG. 6B shows waveforms of a write operation on memory device 204 in the low-byte-first input sequence. The detailed description of the waveforms in FIG. 6B from T1 through T5 is similar to that of FIG. 6A and is not repeated, except that the value of LSB A0 is set to be zero (A0=0). Referring to FIG. 6B, in the data input section of the timing diagram commencing at time T6, memory device 204 inputs data beginning from the data to be stored at the memory address specified by memory address data (A31-A1) as data bytes Byte 0-Byte 3. Accordingly, after A0=0 is received, CPU 210 of memory device 204 inputs Byte 0 (a low byte) at time T6 on the rising edge of a clock cycle, and inputs Byte 1 (a high byte) at time T7 on the falling edge of the same clock cycle. In the next clock cycle, CPU 210 of memory device 204 inputs Byte 2 (a low byte) at time T8 on the rising edge of the clock cycle, and inputs Byte 3 (a high byte) at time T9 on the falling edge of the clock cycle. Although four bytes (Byte 0-Byte 3) are illustrated to be input in FIG. 6B, the quantity of the output data is not so limited. Data of more or less than four bytes can be input consistent with the embodiment, under control of MCU 202, as similarly described with respect to FIGS. 3A and 3B.

Accordingly, the embodiments of the present disclosure provide an electronic device having an I/O interface that can simultaneously receive a memory access address and information indicating data input sequence. Here, "simultaneously" means within the same clock cycle, e.g., T4 and T5 in FIGS. 6A and 6B, in which A15-A1 contains portions of memory address data indicating the memory address to be accessed and A0 indicates the data input sequence, or within the same clock edge, e.g., T5 in FIGS. 6A and 6B, in which A7-A1 contains a portion of memory address data indicating the memory address to be accessed and A0 indicates the data input sequence. The electronic device reads one bit to determine the input sequence and other bits to determine a portion of the accessed address of the memory. In some embodiments, the bit specifying the input sequence is the LSB. In the embodiments above, although A0=1 selects the high-byte-first sequence and A0=0 selects the low-byte-first sequence, this disclosure is not limited to these settings. For example, A0=1 can be used to select the low-byte-first sequence and A0=0 can be used to select the high-byte-first sequence.

Figure 7:
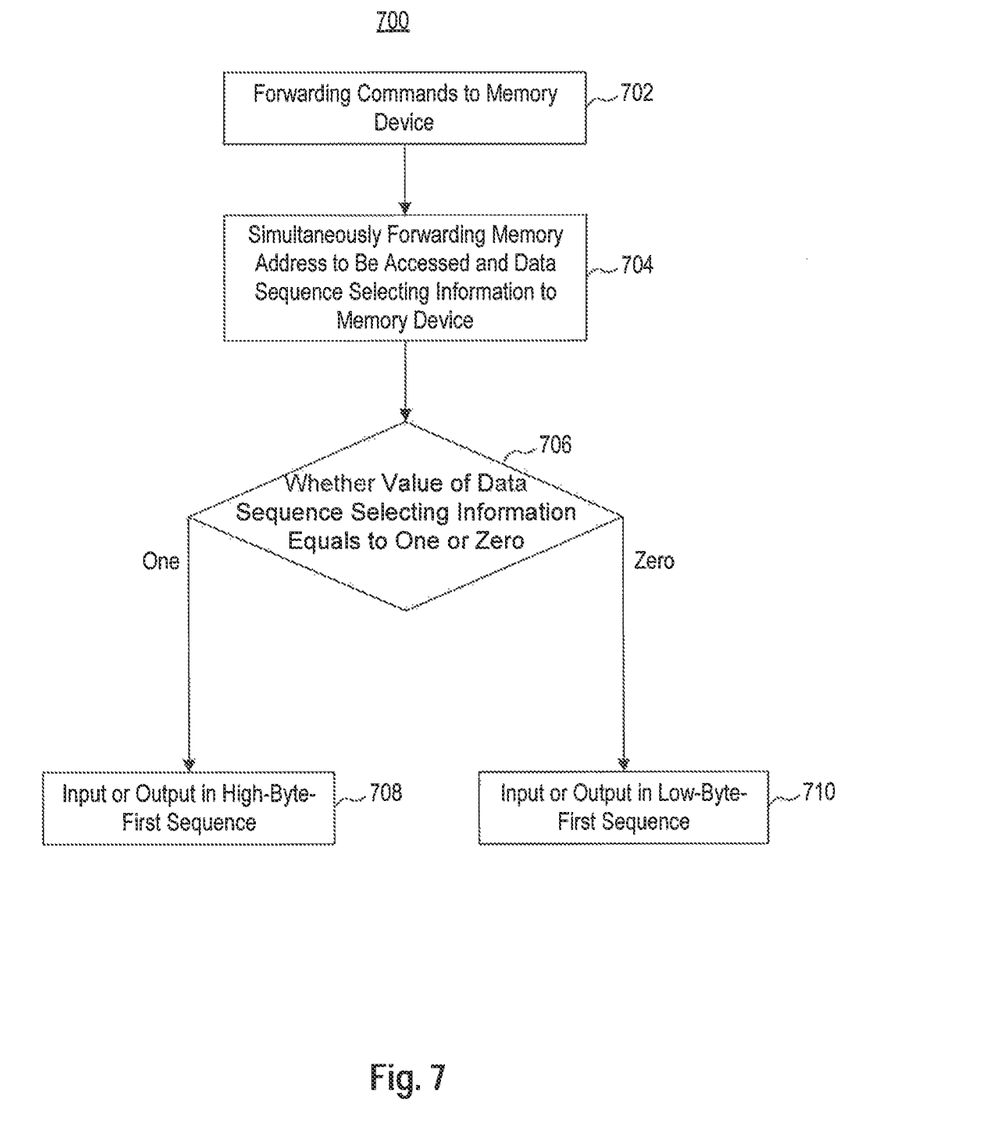
FIG. 7 shows a flow chart of an exemplary method of transferring data consistent with embodiments of this disclosure.

Consistent with the present embodiments, this disclosure further provides a computer-implemented method of reading or writing a memory device. FIG. 7 depicts a flow chart of an exemplary method 700 for reading data from or writing data to a memory device. Referring to FIG. 7, in step 702, a control section such as MCU 202 forwards commands for reading or writing to a memory device, such as memory device 204 in FIG. 2, through one or more data buses, e.g., data bus 206. In step 704, MCU 202 simultaneously forwards a memory address to be accessed and data sequence selecting information to memory device 204. As discussed above, "simultaneously" means within the same clock cycle, e.g., T4 and T5 in FIGS. 6A and 6B, or at the same clock edge, e.g., T5 in FIGS. 6A and 6B. For example, in some embodiments, the memory address and data sequence selecting information may be received by memory device 204 within the same clock cycle or within the same clock rising edge (e.g., T3 in FIGS. 5A and 5B) or falling edge (e.g., T5 in FIGS. 3A and 3B). In some embodiments, the data sequence selecting information may be a value of the least or a less significant bit.

Referring again to FIG. 7, in step 706 it is determined whether a value of the data sequence selecting information is equal to one or zero. If the value equals one, the method moves to step 708 in which memory device 204 inputs or outputs data in a high-byte-first sequence. According to the high-byte-first sequence, a high byte (or odd byte) is input or output before a low byte (or even byte) is input or output. Examples of the high-byte-first sequence are shown in FIGS. 3A and 6A. In some embodiments, the input or output data can be in word units so that a high word (or odd word) is input or output before a low word (or even word) is input or output. Examples of the high-word-first sequence are shown in FIGS. 4A and 5A.

If it is determined in step 706 that the value equals zero, the method moves to step 710 in which memory device 204 inputs or outputs data in a low-byte-first sequence. According to the low-byte-first sequence, a low byte (or even byte) is input or output before a high byte (or odd byte) is input or output. Examples of the low-byte-first sequence are shown in FIGS. 3B and 6B. In some embodiments, the input or output data can be in word units so that a low word (or even word) is input or output before a high word (or odd word) is input or output. Examples of the low-word-first sequence are shown in FIGS. 4B and 5B.

In some embodiments, method 700 can be implemented as instructions stored in a non-transitory storage medium, e.g., included in memory unit 212 (FIG. 2) and executed by a processor, such as CPU 210 (FIG. 2).

Memory device 204 can be a flash memory, Electrically Erasable Programmable Read-Only Memory (EEPROM), Dynamic Random Access Memory (DRAM), etc.

Although exemplary embodiments have been shown and described, it will be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A memory device comprising:
an input/output interface configured to receive input and output signals, wherein:
the input/output interface is configured to receive a memory address to be accessed and data sequence information within a clock cycle or at an edge of a clock cycle, the data sequence information specifying an input or output data sequence; and
the data sequence information specifies a byte sequence, the byte sequence determining whether high bytes are input or output at rising edges or at falling edges of the clock cycle.

2. The memory device of claim 1, wherein the data sequence information is a bit subsequent to bits representing the memory address to be accessed.

3. The memory device of claim 2, wherein the data sequence information is the least or a less significant bit.

4. The memory device of claim 1, wherein
the byte sequence specifies a high-byte-first data input or output sequence in which an odd byte is input or output at a rising edge of the clock cycle before an even byte which is input or output at a falling edge of the clock cycle.

5. The memory device of claim 1, wherein the byte sequence specifies a low-byte-first data input or output sequence in which an even byte is input or output at a rising edge of the clock cycle before an odd byte which is input or output at a falling edge of the clock cycle.

6. The memory device of claim 1, wherein the data sequence information specifies a high-word-first data input or output sequence in which an odd word is input or output before an even word.

7. The memory device of claim 6, wherein the high-word-first data sequence specifies at least two odd words are input or output on a rising edge of the clock cycle and at least two even words are input or output on a falling edge of the clock cycle.

8. The memory device of claim 1, wherein the data sequence information specifies a low-word-first data input or output sequence in which an even word is input or output before an odd word.

9. The memory device of claim 1, further comprising:
a processor configured to read the data sequence information and control data input or output based on the data sequence information.

10. The memory device of claim 1, wherein the data sequence is followed by one or more dummy cycles; and
during the one or more dummy cycles the input/output interface is configured to receive a high impedance signal.

11. A method of transferring data, the method comprising:
forwarding to a memory device a memory address to be accessed and data sequence information within a clock cycle or at an edge of a clock cycle, the data sequence information specifying an input or output data sequence, wherein the data sequence information specifies a byte sequence, the byte sequence determining whether high bytes are input or output at rising edges or at falling edges of the clock cycle.

12. The method of claim 11, wherein the data sequence information is a bit subsequent to bits representing the memory address to be accessed.

13. The method of claim 12, wherein the data sequence information is the least or a less significant bit.

14. The method of claim 11, wherein the inputting or outputting of data includes inputting or outputting the data according to the byte sequence of a high-byte-first data input or output sequence in which an odd byte is input or output at a rising edge of the clock cycle before an even byte which is input or output at the falling edge of the clock cycle.

15. The method of claim 11, wherein the inputting or outputting of data includes inputting or outputting the data according to the byte sequence of a low-byte-first data input or output sequence in which an even byte is input or output at a rising edge of the clock cycle before an odd byte which is input or output at the falling edge of the clock cycle.

16. The method of claim 11, wherein the inputting or outputting of data includes inputting or outputting the data according to the data sequence information of a high-word-first data input or output sequence in which an odd word is input or output before an even word.

17. The method of claim 11, wherein the inputting or outputting of data includes inputting or outputting the data according to the data sequence information of a low-word-first data input or output sequence in which an even word is input or output before an odd word.

18. The method of claim 11, further comprising:
inputting or outputting data to or from the memory device based on the data sequence information.

19. A non-transitory computer-readable storage medium storing instructions which, when executed by one or more processors, cause the one or more processors to:
forward to a memory device a memory address to be accessed and data sequence information within a clock cycle or at an edge of a clock cycle, the data sequence information specifying an input or output data sequence,
wherein the data sequence information specifies a byte sequence, the byte sequence determining whether high bytes are input or output at rising edges or at falling edges of the clock cycle.

20. The non-transitory computer-readable storage medium according to claim 19, wherein the instructions further cause the one or more processors to:
input or output data to or from the memory device based on the data sequence information.

* * * * *